United States Patent
Sigal

(10) Patent No.: US 8,181,212 B2
(45) Date of Patent: May 15, 2012

(54) METHOD OF PROVIDING A FRAME-BASED OBJECT REDIRECTION OVERLAY FOR A VIDEO STREAM

(75) Inventor: Frederic Sigal, Paris (FR)

(73) Assignee: Frederic Sigal, Paris (FR)

( * ) Notice: Subject to any disclaimer, the term of this patent is extended or adjusted under 35 U.S.C. 154(b) by 582 days.

(21) Appl. No.: 12/262,014

(22) Filed: Oct. 30, 2008

(65) Prior Publication Data
US 2010/0111360 A1    May 6, 2010

(51) Int. Cl.
  *H04N 7/173*    (2011.01)
  *G06F 3/00*    (2006.01)
  *G06F 3/048*    (2006.01)
  *G06Q 30/00*    (2012.01)

(52) U.S. Cl. .... 725/113; 725/60; 705/14.55; 705/14.58; 715/791

(58) Field of Classification Search ................ 725/113, 725/60; 705/26.1, 14.55, 14.58; 715/791
See application file for complete search history.

(56) References Cited

U.S. PATENT DOCUMENTS
7,284,199 B2 * 10/2007 Parasnis et al. ............... 715/201
2003/0009281 A1   1/2003 Whitham
2007/0162942 A1   7/2007 Hamynen et al.

FOREIGN PATENT DOCUMENTS
WO    2007/021996 A2    2/2007

OTHER PUBLICATIONS
International Search Report and the Written Opinion for PCT/EP2009/064193 mailed Mar. 15, 2010 (12 pages).
International Preliminary Report on Patentability issued in PCT/EP2009/064193 on May 3, 2011, 6 pages.

* cited by examiner

*Primary Examiner* — Hoang-Vu A Nguyen-Ba
(74) *Attorney, Agent, or Firm* — Osha • Liang LLP

(57) ABSTRACT

A method of providing a frame-based object redirection overlay for a video stream provided by a third-party content provider and hosted by a host provider that may or may not be the same as the third-party content provider. One or more objects depicted within a frame of a video stream are selected. A user is presented with a tag corresponding to the selected object. Upon detection of the user's selection of the tag, the user is presented with options corresponding to the selected tag. The options are determined by the location of the user, the user's preferences, and enforcement of localization rules. Upon detection of the user's selection of an option, an action is taken that corresponds to the user's selection of the option.

24 Claims, 3 Drawing Sheets

METHOD OF PROVIDING A FRAME-BASED OBJECT REDIRECTION OVERLAY FOR A VIDEO STREAM

BACKGROUND OF INVENTION

The conventional provision of a video stream includes the transmission of an encoded video stream by a content provider to an end-user device through a network connection. The end-user device decodes and displays the video stream upon commands executed by a user. The user navigates the decoded video stream through an interface that may provide the ability to start, stop, pause, advance, or reverse the video stream.

The content provider encodes the video stream using one of the well-known encoding techniques to produce an encoded video stream suitable for transmission through the network connection. Software on the end-user's device decodes the encoded video stream and displays the decoded video stream on a display device.

SUMMARY OF INVENTION

According to one aspect of one or more embodiments of the present invention, a method includes: selecting an object displayed in a frame of a video stream; presenting a user a tag corresponding to the selected object within the frame; detecting the user's selection of the tag; presenting the user an option corresponding to the selected tag; detecting the user's selection of the option; and performing an action in accordance with the user's selection of the option.

According to one aspect of one or more embodiments of the present invention, a device suitable for displaying a video stream includes: a processor; a storage device; a display device; a network device; wherein the processor executes software instructions which perform: presenting a user a tag corresponding to an object within a frame of a video stream; detecting the user's selection of the tag; presenting the user an option corresponding to the selected tag; detecting the user's selection of the option; and performing an action in accordance with the user's selection of the option.

According to one aspect of one or more embodiments of the present invention, a computer readable medium comprising computer executable software instructions which, when executed by a processor, perform: presenting a user a tag corresponding to an object within a frame of a video stream; detecting the user's selection of the tag; presenting the user an option corresponding to the selected tag; detecting the user's selection of the option; and performing an action in accordance with the user's selection of the option.

Other aspects of the present invention will be apparent from the following description and the appended claims.

DETAILED DESCRIPTION

Figure 1:
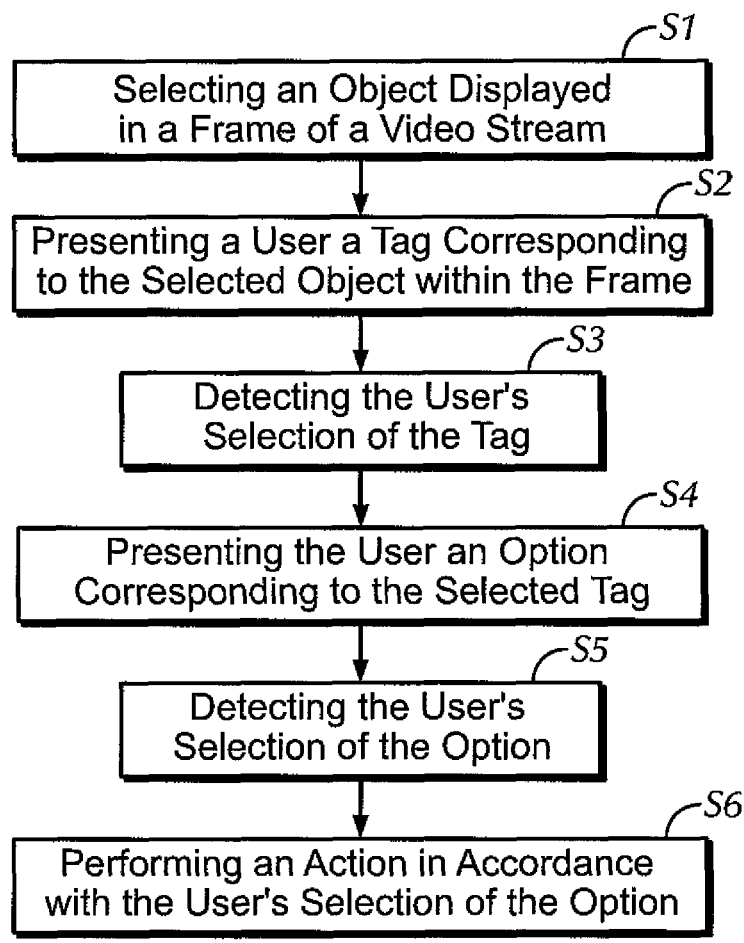
FIG. 1 shows a method in accordance with one or more embodiments of the present invention.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

FIG. 1 shows a method of providing a frame-based object redirection overlay for a video stream. In S1, an object displayed within a frame of a video stream is selected. In one or more embodiments of the present invention, the selecting includes identifying a video stream of interest. In a preferred embodiment of the present invention, the video stream is provided by a third-party content provider and is hosted by a host provider that may or may not be the same as the third-party content provider.

The video stream is analyzed to determine information relating to the video stream itself and objects depicted in the video stream. The information includes the duration of the video stream, the number of chapters contained in the video stream, one or more objects depicted in the video stream, start and finish times of the chapters contained in the video stream, and times when objects are depicted in the video stream. A overlay file is created to store the information determined from the analysis. In addition, the overlay file stores information relating to the tagging of objects depicted in the video stream, presenting of options corresponding to the tagged objects, and performance of actions corresponding to the options.

The overlay file is provided to a user of a device in advance of providing a link to the video stream provided by the third-party content provider and hosted by the host provider or third-party content provider. In one or more embodiments of the present invention the device is a mobile computing device such as a smart phone, a personal digital assistant, a handheld computer, a netbook, or a laptop computer. In one or more embodiments of the present invention the device is a computing device such as a desktop or a server computer. In one or more embodiments of the present invention the device is a consumer electronics device such as a media player, a monitor, or a television.

In S2, a tag corresponding to the selected object within the displayed frame is presented to the user. The tag is a visual depiction of an indication that further actions related to the object depicted and tagged are available. The tag may include further description of the tagged object. The tag may include private fields that are not displayed and serve to identify the tagged object as a unique identifier and reference to merchant sites or different URLs. In one or more embodiments of the present invention, the user is presented with a dialog box or an alternate frame instead of a tag. In a preferred embodiment of the present invention, the user is presented with one or more tags corresponding to one or more selected objects within the displayed frame when the video stream is paused on the device. One of ordinary skill in the art will recognize that the user could be presented with one or more tags corresponding to one or more selected objects within the displayed frame while the video stream is being played on the device in accordance with one or more embodiments of the present invention.

In one or more embodiments of the present invention, a location of the user and device is determined by a network connection. The network connection is a cellular data network, a short-range wireless network, a long-range wireless network, a wired network, or a global positioning satellite system. The determination of the location of the user and device provides for customization of tags presented to the user, enforcement of restrictions on the tags presented to the user, and localization of the tags presented to the user.

In one or more embodiments of the present invention, upon a determination of the location of the user and device, the tag may be presented in the user's native language, the user's native language being different than the native language spoken at the location of the user and the device. The user's native language is determined by a preference selected by the user in advance or the device.

In S3, the device reproducing the video stream detects the user's selection of one of the one or more tags corresponding to the one or more objects displayed within a frame of the video stream. In a preferred embodiment of the present invention, the detection is based on a touch-screen interface of the device reproducing the video stream. The touch-screen interface spans the display area of the device. One of ordinary skill in the art will recognize that a cursor, a mouse, a keyboard, or other conventional interface means could be utilized in accordance with one or more embodiments of the present invention.

In S4, upon the detection of a user's selection of a tag corresponding to an object displayed within a frame of the video stream, the user is presented with one or more options corresponding to the selected tag. The options include choices that are dependent on the location of the user and device at the time the tag is selected. In a preferred embodiment of the present invention, one option includes a location of one or more physical merchant stores near the location of the user and device so that the user may browse or purchase the physical object corresponding to the tagged object. Another option provides a link to a web-based merchant store that sells the tagged object. In a preferred embodiment of the present invention, the user is linked to a web-based merchant store in the country in which the user and device are located or a home country of the user. Another option provides textual, graphical, audio, video, web-based, or other ad-hoc content. The determination of the location of the user and device provides for customization of options presented to the user, enforcement of restrictions on the options presented to the user, and localization of the options presented to the user.

In S5, the user's selection of an option is detected by the device. In a preferred embodiment of the present invention, the detection is based on the touch-screen interface of the device reproducing the video stream. The touch-screen interface spans the display area of the device. One of ordinary skill in the art will recognize that a cursor, a mouse, a keyboard, or other conventional interface means could be utilized in accordance with one or more embodiments of the present invention.

In S6, the device is directed to perform an action in accordance with the user's selection of the option. For the purposes of illustration only, a user browsing a museum may view a video stream depicting the works of art located within the museum (a video tour). The user may select a tag corresponding to a specific piece of art depicted in the video stream that is of interest to the user. Upon selection of the tag, the user is presented with one or more options that correspond to actions that may be taken. One option provides the location of nearby physical merchant stores that sell prints of the piece of art. Another option provides links to web-based merchant stores that sell prints of the piece of art. Another option provides one or more of a textual description of the piece of art, a graphical depiction of the artist, an audio commentary by a critic, a related video clip of interest, a website of interest, or other ad-hoc content. Another option directs the user to the specific piece of art depicted as determined by the user's current location and a map of the museum. Another option directs the user to nearby pieces of art that might be of interest to those that appreciate the specific piece of art selected.

One of ordinary skill in the art will recognize that while the method has been described with reference to a video stream, the method could be applied to a downloaded video in accordance with one or more embodiments of the present invention.

Figure 2:
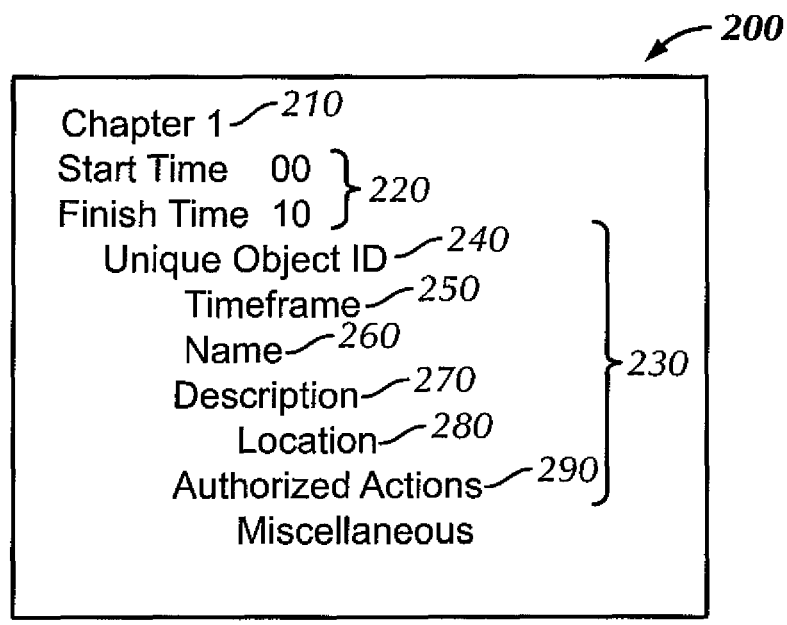
FIG. 2 shows an exemplary structure of a overlay file in accordance with one or more embodiments of the present invention.

FIG. 2 shows an exemplary structure of a overlay file in accordance with one or more embodiments of the present invention. A preferred embodiment of the present invention structures the overlay file 200 by the start and finish times of one or more chapters. For purposes of illustration only, consider overlay file 200 that corresponds to a thirty second video stream that includes one chapter. In overlay file 200, chapter one 210 may be defined to start at time {0} and finish at time {10}. One of ordinary skill in the art will recognize that the granularity of the time scale could be changed in accordance with one or more embodiments of the present invention. In addition, one of ordinary skill in the art will recognize that there may be a plurality of chapters that vary in length in accordance with one or more embodiments of the present invention.

In the overlay file 200, chapter one 210, identified by the start and finish times 220, includes a list of one or more objects 230. Each of the objects 230 includes a unique ID 240 for the object, a timeframe 250 when the object is depicted in the video stream, a name 260 of the object, a description 270 of the object, and actions authorized 290 for the object. The description 270 includes a location 280 of the object 230 displayed within one or more frames identified by the timeframe 250. Each chapter may vary in having no objects, one object, or a plurality of objects for a given chapter. One of ordinary skill in the art will recognize that the overlay file 200 could be structured differently in accordance with one or more embodiments of the present invention.

As noted above, the location 280 of the object 230 is specified in the overlay file 200 as part of the description 270. In one or more embodiments of the present invention, the location 280 is represented by a polygon that describes the location of an object within the displayed frame. In one or more embodiments of the present invention, the location is represented by a division of the displayed frame into zones. One of ordinary skill in the art will recognize that the location may be represented in a variety of manners in accordance with one or more embodiments of the present invention.

Figure 3:
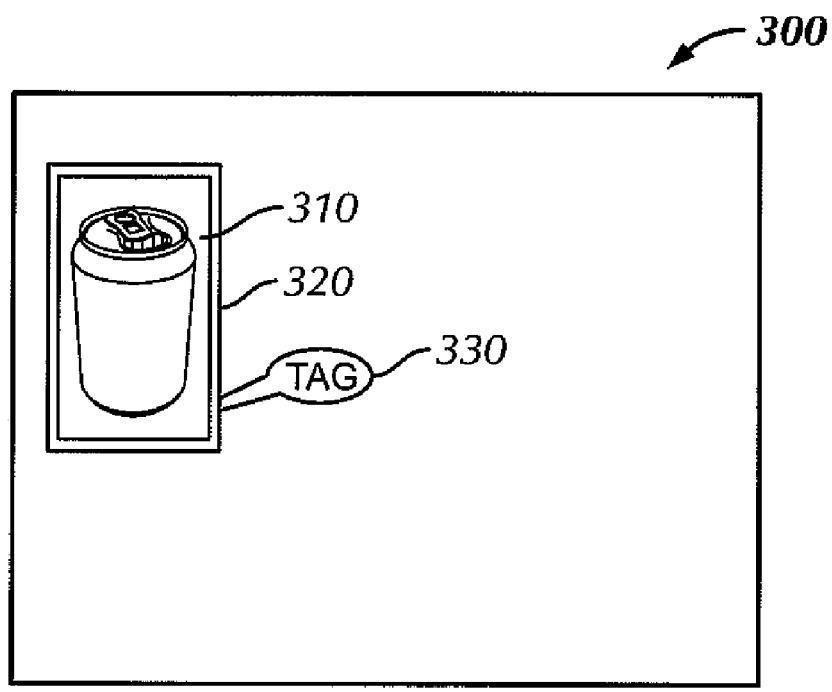
FIG. 3 shows a polygon approach to describe the location of an object within a displayed frame in accordance with one or more embodiments of the present invention.

FIG. 3 shows a polygon to describe the location of an object within a displayed frame of a video stream in accordance with one or more embodiments of the present invention. An object 310 is depicted in displayed frame 300. A polygon 320 is utilized to describe the location of the object 310 by its exact position within the displayed frame 300. One of ordinary skill in the art will recognize that polygon 320 can be located anywhere within the span of the displayed frame 300 in accordance with one or more embodiments of the present invention. In addition, one of ordinary skill in the art will recognize that polygon 320 can take the shape of any object 310 within the span displayed frame in accordance with one or more embodiments of the present invention. Polygon 320 information, that corresponds to the location of object 310 within the displayed frame 300, is stored in the overlay file for object 310. Based on the overlay file, a tag 330 is presented as an overlay of the displayed frame 300. The tag 330 is operable by the user selecting the tag 330 anywhere within polygon 320.

Figure 4:
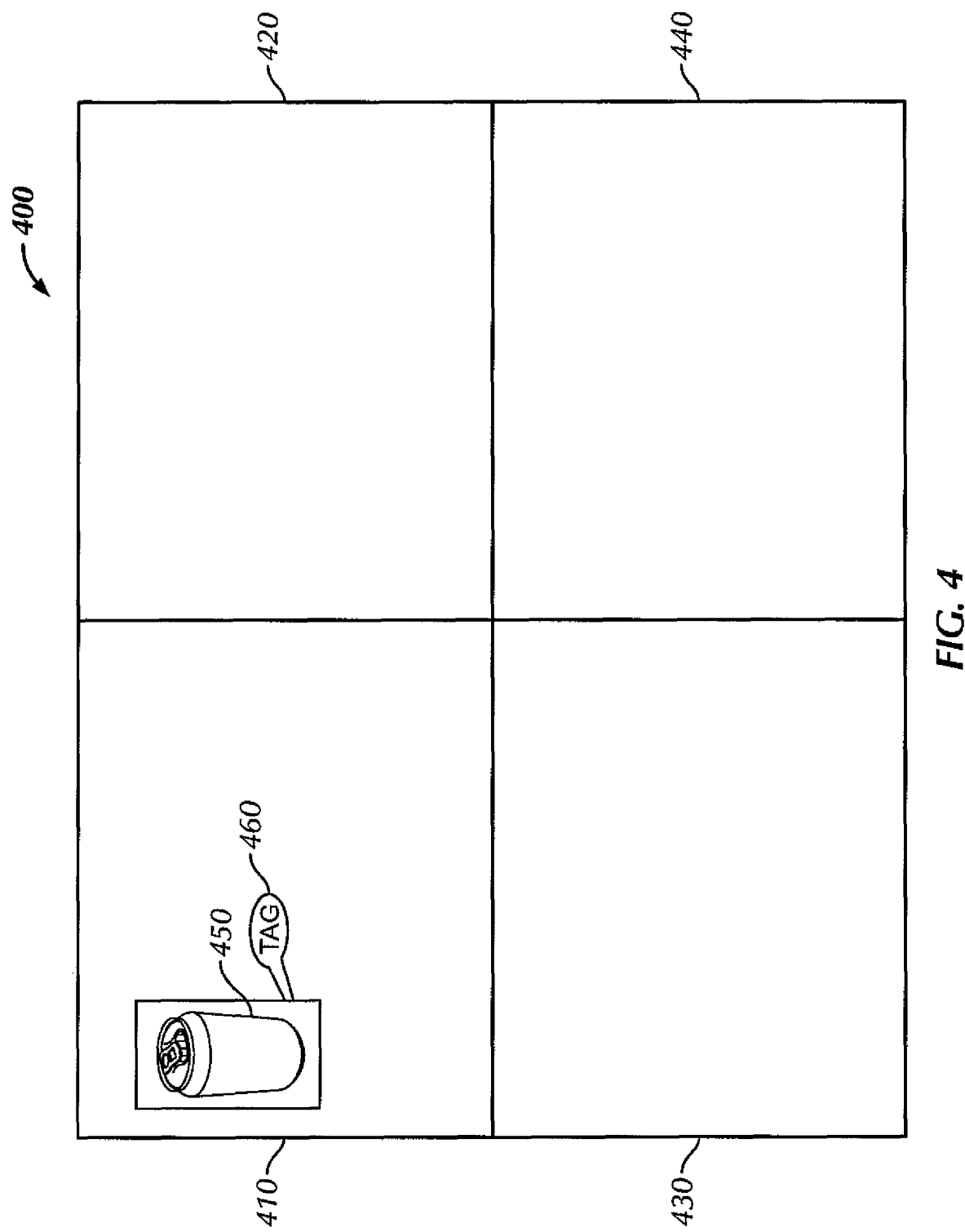
FIG. 4 shows a quadrant approach to describe the location of an object within a displayed frame in accordance with one or more embodiments of the present invention.

In one or more embodiments of the present invention, there may be relatively few objects of interest within a displayed frame. Accordingly, the displayed frame may be divided into zones of roughly equal proportions or zones identified relating to specific objects. FIG. 4 shows a quadrant approach to describe the location of an object within a displayed frame in accordance with one or more embodiments of the present invention. An object 450 is depicted in displayed frame 400. Displayed frame 400 is divided into quadrants 410, 420, 430, and 440 of roughly equal proportions. Object 450 is depicted in quadrant 410 of displayed frame 400. Accordingly, the entire span of quadrant 410 is defined to correspond to object 450. Quadrant 410 information, that corresponds to the location of object 450 within the displayed frame 400, is stored in the overlay file for object 450. Based on the overlay file, a tag 460 is presented as an overlay of the displayed frame 400. The tag 460 is operable by the user selecting the tag 460 anywhere within quadrant 410. One of ordinary skill in the art will recognize that there are a variety of ways in which to partition the displayed frame into zones in accordance with one or more embodiments of the present invention.

Figure 5:
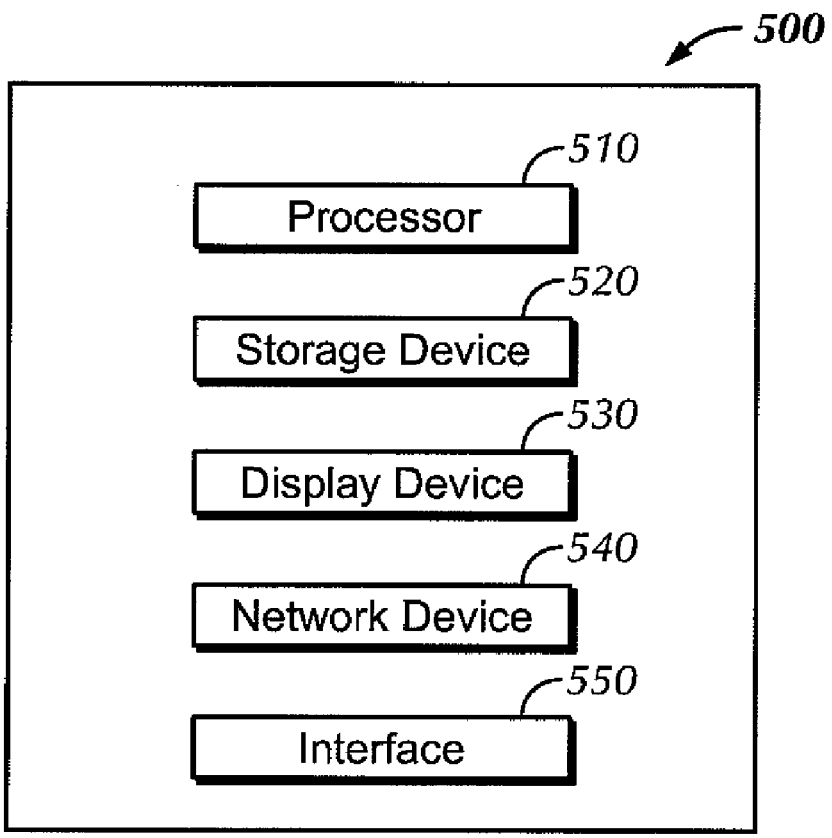
FIG. 5 shows a device in accordance with one or more embodiments of the present invention.

FIG. 5 shows a device in accordance with one or more embodiments of the present invention. A device 500 comprises a processor 510, a storage device 520, a display device 530, a network device 540, and an interface 550. In a preferred embodiment of the present invention, the interface 550 is a touch-screen interface that receives input by touching the display device 530. The touch-screen interface spans the display area of the device 500. One of ordinary skill in the art will recognize that the interface 550 could be a cursor, a mouse, a keyboard, or other conventional interface in accordance with one or more embodiments of the present invention.

For purposes of illustration only, a user seeks to view a video stream provided by a third-party content provider and hosted by a host provider that may or may not be the same as the third-party content provider on the device 500. Upon the user's selection of a link to a video stream, the user is provided with an overlay file specific to the selected link to the video stream by a network connection. The overlay file is prepared in advance in accordance with the method previously described. The video stream is then provided to the user by the host provider or third-party content provider and displayed on the display device 530. In a preferred embodiment of the present invention, the user may pause the video stream. Then the user is presented with one or more tags corresponding to an object depicted within a displayed frame on the display device 530. The overlay file and the presenting of the tags is separate from and independent of the video stream to the extent the video stream is hosted, provided, and displayed on the device 500 at the same time as the one or more tags are presented. The presentation of the tag via the overlay file is invoked upon the pausing of the video stream. The device 500 then waits for input from the user.

The interface 550 detects whether the user has selected a tag. Upon detection of the selection of a tag, the user is presented with one or more options corresponding to the selected tag. The interface 550 detects whether the user has selected an option. Upon detection of the selection of an option, the device 500 performs an action in accordance with the user's selected option. As noted above, that option may be a location of a nearby physical merchant store, a link to a web-based merchant store, textual content, graphical content, audio-based content, video-based content, web-based content, or other ad-hoc content.

Advantages of one or more embodiments of the present invention may include one or more of the following.

In one or more embodiments of the present invention, the method provides a frame-based object redirection overlay for objects depicted in a video stream that is independent of the video stream.

In one or more embodiments of the present invention, the method provides a frame-based object redirection overlay for a video stream of content provided by a third-party content provider.

In one or more embodiments of the present invention, the method provides a frame-based object redirection overlay for a video stream of content provided by a third-party content provider and hosted by a host provider that may or may not be the same as the third-party content provider.

In one or more embodiments of the present invention, the method provides a frame-based object redirection overlay for a video stream provided by a third-party content provider that does not burden a user's viewing experience.

In one or more embodiments of the present invention, the method provides a frame-based object redirection overlay for a video stream provided by a third-party content provider that is not visible to the third-party content provider or a host provider.

In one or more embodiments of the present invention, the method provides a frame-based object redirection overlay for a video stream provided by a third-party content provider that does not burden the provision of content by the third-party content provider or the hosting of content by a host provider.

In one or more embodiments of the present invention, the method may be performed without the participation of a third-party content provider or a host provider.

In one or more embodiments of the present invention, the method may be separate and independent from the production of a video stream of content by a third-party content provider.

In one or more embodiments of the present invention, the method may be separate and independent from the provision of content by a third-party content provider.

In one or more embodiments of the present invention, the method may be separate and independent from the hosting of content by a host provider.

In one or more embodiments of the present invention, the method generates traffic for physical merchant stores, web-based merchant stores, and websites.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computer implemented method comprising:
   analyzing a video stream to identify one or more objects depicted in the video stream;
   producing an overlay file that includes information corresponding to the one or more objects identified in the video stream;
   providing a user device with the overlay file in advance of providing a link to the video stream;
   upon display of the video stream, displaying the overlay file with the video stream on the user device;

upon a user selection of an identified object of the video stream, presenting the user a tag corresponding to the selected object;

detecting the user's selection of the tag;

presenting the user an option corresponding to the selected tag;

detecting the user's selection of the option; and performing an action in accordance with the user's selection of the option, wherein the video stream is provided by a third-party content provider.

2. The method of claim 1, wherein the presenting the user the tag is in accordance with a user determined criterion.

3. The method of claim 1, further comprising determining a location of the user by a network connection.

4. The method of claim 3, wherein the tag is in the user's preferred language and is different than a native language of the location.

5. The method of claim 3, further comprising restricting the option in accordance with the location of the user and the object.

6. The method of claim 3, further comprising restricting the action in accordance with the location of the user and the object.

7. The method of claim 3, wherein the action comprises locating a store, near the location, where the user can purchase the object.

8. The method of claim 1, wherein the action comprises linking the user to a website related to the object.

9. A device suitable for displaying a video stream comprising:

a processor;

a storage device;

a display device; and a network device, wherein the device receives an overlay file that corresponds to a video stream, the overlay file includes information corresponding to one or more objects depicted in the video stream, the video stream is analyzed in advance of providing the overlay file to identify the one or more objects depicted in the video stream to produce the overlay file, the video stream is provided by a third-party content provider, upon display of the video stream, the overlay file is displayed with the video stream, upon selection of an identified object of the video stream, the user is presented with a tag corresponding to the selected object, upon detection of the user's selection of the tag, the user is presented with an option corresponding to the selected tag;

upon detection of the user's selection of the option, an action is performed in accordance with the user's selection of the option.

10. The method of claim 9, wherein the presenting the user the tag is in accordance with a user determined criterion.

11. The method of claim 9, wherein a location of the user is determined by a network connection.

12. The method of claim 11, wherein the tag is in the user's preferred language and is different than a native language of the location.

13. The method of claim 11, wherein the option is restricted in accordance with the location of the user and the object.

14. The method of claim 11, wherein the action is restricted in accordance with the location of the user and the object.

15. The method of claim 11, wherein the action comprises locating a store, near the location, where the user can purchase the object.

16. The method of claim 9, wherein the action comprises linking the user to a website related to the object.

17. A non-transitory computer readable medium comprising computer executable software instructions which, when executed by a processor, perform:

displaying an overlay file with a video stream, wherein the video stream is analyzed in advance to identify one or more objects depicted in the video stream, the overlay file includes information corresponding to the one or more objects identified in the video stream by the analysis, and the video stream is provided by a third-party content provider;

upon user selection of an identified object of the video stream, presenting the user a tag corresponding to the selected object;

detecting the user's selection of the tag;

presenting the user an option corresponding to the selected tag;

detecting the user's selection of the option; and performing an action in accordance with the user's selection of the option.

18. The non-transitory computer readable medium of claim 17, wherein the presenting the user the tag is in accordance with a user determined criterion.

19. The non-transitory computer readable medium of claim 17, further comprising determining a location of the user by a network connection.

20. The non-transitory computer readable medium of claim 19, wherein the tag is in the user's preferred language and is different than a native language of the location.

21. The non-transitory computer readable medium of claim 19, further comprising restricting the option in accordance with the location of the user and the object.

22. The non-transitory computer readable medium of claim 19, further comprising restricting the action in accordance with the location of the user and the object.

23. The non-transitory computer readable medium of claim 19, wherein the action comprises locating a store, near the location, where the user can purchase the object.

24. The non-transitory computer readable medium of claim 17, wherein the action comprises linking the user to a website related to the object.

* * * * *